(12) United States Patent
Ohsawa

(10) Patent No.: US 7,188,307 B2
(45) Date of Patent: Mar. 6, 2007

(54) ACCESS SYSTEM

(75) Inventor: Hiroyuki Ohsawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 09/986,244

(22) Filed: Nov. 8, 2001

(65) Prior Publication Data

US 2002/0055957 A1 May 9, 2002

(30) Foreign Application Priority Data

Nov. 28, 2000 (JP) .............................. 2000-361222

(51) Int. Cl.
*G06F 17/00* (2006.01)

(52) U.S. Cl. ..................... 715/513; 715/501.1; 709/203

(58) Field of Classification Search ................ 715/513, 715/501.1; 709/217, 224, 219, 203; 725/100, 725/109; 710/5; 382/101, 115; 358/402; 348/211.3, 143
See application file for complete search history.

(56) References Cited

U.S. PATENT DOCUMENTS

| | | | | | |
|---|---|---|---|---|---|
| 4,858,000 | A | * | 8/1989 | Lu .............................. | 725/12 |
| 4,878,248 | A | * | 10/1989 | Shyu et al. .................. | 382/105 |
| 5,081,685 | A | * | 1/1992 | Jones et al. .................. | 382/105 |
| 5,164,992 | A | * | 11/1992 | Turk et al. .................. | 382/118 |
| 5,287,271 | A | * | 2/1994 | Rosenbaum .................. | 705/8 |
| 5,497,314 | A | * | 3/1996 | Novak .......................... | 705/17 |
| 5,640,193 | A | * | 6/1997 | Wellner ....................... | 725/100 |
| 5,652,849 | A | * | 7/1997 | Conway et al. ............. | 715/719 |
| 5,781,650 | A | * | 7/1998 | Lobo et al. .................. | 382/118 |
| 5,838,458 | A | * | 11/1998 | Tsai .......................... | 358/402 |
| RE36,041 | E | * | 1/1999 | Turk et al. .................. | 382/118 |
| 5,862,260 | A | * | 1/1999 | Rhoads ....................... | 382/232 |
| 5,911,044 | A | * | 6/1999 | Lo et al. ..................... | 709/203 |
| 5,933,829 | A | * | 8/1999 | Durst et al. ................... | 707/10 |
| 5,940,595 | A | * | 8/1999 | Reber et al. ................. | 709/227 |
| 5,978,773 | A | * | 11/1999 | Hudetz et al. ................ | 705/23 |
| 5,987,154 | A | * | 11/1999 | Gibbon et al. .............. | 382/115 |
| 6,012,102 | A | * | 1/2000 | Shachar ......................... | 710/5 |
| 6,111,517 | A | * | 8/2000 | Atick et al. ................. | 340/5.83 |
| 6,138,151 | A | * | 10/2000 | Reber et al. ................. | 709/219 |
| 6,160,907 | A | * | 12/2000 | Robotham et al. .......... | 382/154 |
| 6,236,735 | B1 | * | 5/2001 | Bjorner et al. ............. | 382/101 |
| 6,266,442 | B1 | * | 7/2001 | Laumeyer et al. .......... | 382/190 |
| 6,311,214 | B1 | * | 10/2001 | Rhoads ....................... | 709/217 |
| 6,314,457 | B1 | * | 11/2001 | Schena et al. ............. | 709/219 |
| 6,330,976 | B1 | * | 12/2001 | Dymetman et al. ......... | 235/487 |
| 6,353,848 | B1 | * | 3/2002 | Morris ....................... | 709/203 |
| 6,360,001 | B1 | * | 3/2002 | Berger et al. ............... | 382/101 |
| 6,427,078 | B1 | * | 7/2002 | Wilska et al. ............. | 455/550.1 |
| 6,445,468 | B1 | * | 9/2002 | Tsai ........................... | 358/402 |
| 6,473,523 | B1 | * | 10/2002 | Newman et al. ............ | 382/176 |
| 6,510,461 | B1 | * | 1/2003 | Nielsen ....................... | 709/224 |
| 6,519,362 | B1 | * | 2/2003 | Cusmariu .................... | 382/176 |
| 6,546,119 | B2 | * | 4/2003 | Ciolli et al. ................. | 382/104 |

(Continued)

OTHER PUBLICATIONS

Unknown, "Technology Links Ads to Website Via Cell Phone", Nov. 6, 2003, picturephoning.com, downloaded from hyyp://www.textually.org/picturephoning/archives/002224.htm.*

(Continued)

*Primary Examiner*—Heather R. Herndon
*Assistant Examiner*—James H Blackwell
(74) *Attorney, Agent, or Firm*—Fitzpatrick, Cella, Harper & Scinto

(57) ABSTRACT

A character string is extracted from an image photographed by a camera. It is determined whether or not the extracted character string includes an address on a network. Software for accessing the address runs. Accordingly, a user can easily access a desired address on the network.

6 Claims, 12 Drawing Sheets

U.S. PATENT DOCUMENTS

| | | | | |
|---|---|---|---|---|
| 6,567,122 | B1* | 5/2003 | Anderson et al. | 348/211.3 |
| 6,583,813 | B1* | 6/2003 | Enright et al. | 348/150 |
| 6,614,914 | B1* | 9/2003 | Rhoads et al. | 382/100 |
| 6,650,761 | B1* | 11/2003 | Rodriguez et al. | 382/100 |
| 6,658,662 | B1* | 12/2003 | Nielsen | 725/109 |
| 6,678,864 | B1* | 1/2004 | Tsai | 715/501.1 |
| 6,683,967 | B1* | 1/2004 | Takahashi | 382/101 |
| 6,697,103 | B1* | 2/2004 | Fernandez et al. | 348/143 |
| 6,698,021 | B1* | 2/2004 | Amini et al. | 725/105 |
| 6,735,324 | B1* | 5/2004 | McKinley et al. | 382/100 |
| 6,754,663 | B1* | 6/2004 | Small et al. | 707/102 |
| 6,766,036 | B1* | 7/2004 | Pryor | 382/103 |
| 6,798,895 | B1* | 9/2004 | Takahashi | 382/101 |
| 6,877,134 | B1* | 4/2005 | Fuller et al. | 715/500.1 |
| 6,917,722 | B1* | 7/2005 | Bloomfield | 382/313 |
| 6,965,398 | B2* | 11/2005 | Arakt | 348/211.3 |
| 6,985,827 | B2* | 1/2006 | Williams et al. | 702/142 |
| 7,076,495 | B2* | 7/2006 | Dutta et al. | 707/102 |
| 2001/0001854 | A1* | 5/2001 | Schena et al. | 705/27 |
| 2002/0102966 | A1* | 8/2002 | Lev et al. | 455/412 |
| 2003/0093384 | A1* | 5/2003 | Durst et al. | 705/64 |
| 2003/0133015 | A1* | 7/2003 | Jackel et al. | 348/207.1 |
| 2005/0116945 | A1* | 6/2005 | Mochizuki et al. | 345/418 |

OTHER PUBLICATIONS

Unknown, "Sem@code: Real-World Hyperlinks with a Camera Phone", Nov. 6, 2003, picturephoning.com, downloaded from http://www.textually.org/picturephoning/archives/002505.htm.*

CNET, "Camera Phone Clicks as a Credit Card", date unknown, downloaded from http://news.znet.com/2102-9584_22-5057623.html.*

Wienecke et al.,"Video-based Whiteboard Reading", Bielefeld Univ.,Aug. 4-6, 2003, IEEE,pp. 1-5.*

Wu et al.,"Detection of Text on Road Signs From Video", 2005, IEEE, pp. 378-390.*

Clark et al.,"Finding Text Regions Using Localised Measures", Sep. 2000, Univ. of Bristol, 10 pages.*

Meijer,"Mobile OCR, Face and Object Recognition for the Blind",Dec. 25, 2001, 3 pages.*

Jung ,"Text Scanner with Text Detection Technology on Image Sequences",2002, ICPR, pp. 473-476.*

Lienhart,"Automatic Text Recognition for Video Indexing", 1996, ACM, pp. 11-20.*

Jung et al.,"Text Information Extraction in Images and Video: A Survey",Mar. 26, 2005, 35 pages.*

Yamaguchi et al.,"Extraction of Place-Name from Natural Sources", IEEE, 2002, 5 pages.*

Price,"Bibliography Find Text in General Scenes, Color Documents", date unknown, 10 pages.*

* cited by examiner http://www.xyzshoji.co.jp 100-001

FIG. 10

| Mime-Type | COMMAND |
|---|---|
| *.html | Explorer.exe |
| *.jpeg | Viewer.exe |
| *.wav | Player.exe |

EXECUTION INFORMATION TABLE

FIG. 13

| SYMBOL-URL TABLE | |
|---|---|
| SYMBOL | URL |
| SYMBOL A | http://www.xyzshoji.co.jp |
| SYMBOL B | ⋮ |
| ⋮ | ⋮ |

ACCESS SYSTEM

BACKGROUND OF THE INVENTION

1. Field of the Invention

The present invention relates to an access system in which a monitoring camera is connected to a network, such as the Internet, and a server is accessed by using an image captured by the monitoring camera.

2. Description of the Related Art

Currently, a variety of information described in HTML (Hyper Text Markup Language) can be interchanged on the World Wide Web (WWW). The Internet is greatly expandable and, in addition to the interchange of text data, a variety of information, e.g., still image information, moving image information, and Java programs, can be transferred. A user can obtain a lot of information via the Internet by linking resources in worldwide networks and can acquire information at a location designated by a unique URL (Uniform Resource Locator). In general, the URL specifies the address of an HTML file, for example, a homepage. Recently, for accessing organizations, URLs of homepages are described in various media such as magazines and signboards as well as on the Internet.

The Internet uses a system for distributing, in real time, video images such as a landscape by connecting a remote control camera. In this case, URLs are displayed on the signboards in the photographed video images.

Still images and moving images on the signboards on which the URLs are printed can be easily captured as digital image data. Since no link information is included in addition to the image information, after visually checking the URL, the user must access the homepage by starting the browser and inputting the URL, which is troublesome.

SUMMARY OF THE INVENTION

To solve the above-mentioned problem, it is an object of the present invention to provide an improved use experience.

To accomplish this object, according to a first aspect of the present invention, there is provided an access system that includes: a display device for displaying an image photographed by an image pickup device on a screen; and a control device for extracting a character string included in the image displayed on the screen, interpreting the extracted character string, and starting software for accessing an address included in the interpreted character string via a network.

According to a second aspect of the present invention, there is provided an access system that includes: a receiving device for receiving an image photographed by an image pickup device; and a control device for extracting the predetermined symbol included in the image displayed on a screen by referring to a memory for storing a predetermined symbol and an address corresponding to the predetermined symbol and executing processing for accessing an address corresponding to the extracted predetermined symbol.

According to a third aspect of the present invention, there is provided an access system that includes: a receiving device for receiving an image photographed by an image pickup device and information on the photographed image; and a control device for, when it is determined based on the information on the photographed image that the image received by the receiving device includes a predetermined image, referring to a memory for storing an address corresponding to the photographed image and executing processing for accessing an address corresponding to the predetermined image.

According to a fourth aspect of the present invention, there is provided an access method that includes the steps of: extracting a character string included in an image displayed on a screen; interpreting the extracted character string; and starting software for accessing an address included in the interpreted character string via a network.

According to a fifth aspect of the present invention, there is provided an access method that includes the steps of: extracting a predetermined symbol included in an image displayed on a screen by referring to a memory for storing the predetermined symbol and an address corresponding to the predetermined symbol; and executing processing for accessing the address corresponding to the extracted predetermined symbol.

According to a sixth aspect of the present invention, there is provided an access method that includes the steps of: receiving an image photographed by an image pickup device and information on the photographed image; and when it is determined based on the information on the photographed mage that the image received by the receiving device includes a predetermined image, referring to a memory for storing an address corresponding to the photographed image and executing processing for accessing the address corresponding to the predetermined image.

According to a seventh aspect of the present invention, there is provided a storage medium for storing a program for executing an operational processing method of an access system, wherein the program includes: program code of an extraction step of a character string included in an image displayed on a screen; program code of an interpretation step of the extracted character string; and program code of an access step of starting software for accessing an address included in the interpreted character string via a network.

According to an eighth aspect of the present invention, there is provided a storage medium for storing a program for executing an operational processing method of an access system, wherein the program includes: program code of an extraction step of a predetermined symbol included in an image displayed on a screen by referring to a memory for storing the predetermined symbol and an address corresponding to the predetermined symbol; and program code of an execution step of processing for accessing the address corresponding to the extracted predetermined symbol.

According to a ninth aspect of the present invention, there is provided a storage medium for storing a program for executing an operational processing method of an access system, wherein the program includes: program code of a reception step of an image photographed by an image pickup device and information on the photographed image; and, when it is determined based on the information on the photographed image that the image received by the receiving device includes a predetermined image, program code of an execution step of referring to a memory for storing an address corresponding to the photographed image and executing processing for accessing an address corresponding to the predetermined image.

Further objects, features and advantages of the present invention will become apparent from the following description of the preferred embodiments with reference to the attached drawings.

BRIEF DESCRIPTION OF THE DRAWINGS

FIG. 10 is a diagram showing an example of a URL execution information table.

FIG. 13 is a diagram showing an example of a symbol-URL table.

DESCRIPTION OF THE PREFERRED EMBODIMENTS

Hereinbelow, embodiments of the present invention will be described with reference to the drawings.

First embodiment

Figures 1, 2:
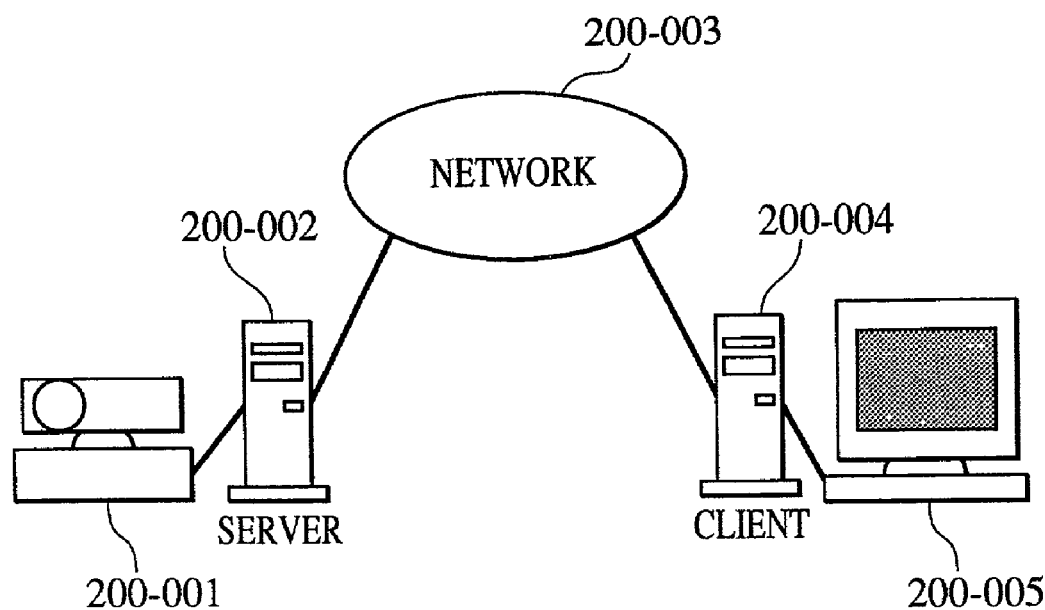
FIG. 1 is a diagram showing an example of a URL in the present invention.
FIG. 2 is a diagram schematically showing an image distribution system.

FIG. 1 is a diagram showing an example of a URL in the present invention. The URL is composed of a character string that indicates the location of a resource on the Internet, for example a character string 100-001. URLs may be developed and changed in the future and will not always be described as shown in FIG. 1. According to the first embodiment, the URL specifies the character string 100-001 for uniquely identifying the resource on the network. The network may be the Internet, a WAN, or a LAN. The syntax of the character string 100-001 designating the URL may be extended in the future.

The character string 100-001 is applied in a wide variety of fields and, for example, is used for specifying the location of the homepage of a company. Referring to FIG. 1, the character string 100-001 denotes the address of the homepage of a corporation xyz. The user can obtain information such as customer information and product information using a character string including the URL.

FIG. 2 is a diagram schematically showing an image distribution system for distributing, in real time, images photographed by a camera to a client via the network. A camera 200-001 connected to a server device 200-002 can be installed outdoors, and can photograph signboards, etc., in towns and can then transmit, in real time, the images to a client device 200-004 which can browse the images. The server device 200-002 can transmit the images photographed by a camera 200-001 connected thereto to the client via a network 200-003. Further, the server device 200-002 can transmit live moving image information and live still images and can process image information such as moving image information and still image information, which are stored in a storage device integrated or connected to the server device 200-002.

The client device 200-004 receives an image and information which are transmitted by the server device 200-002 and, thus, the user can browse the image and the information. A display 200-005 connected to the client device 200-004 displays the image and the information.

The server device 200-002, which transmits the image, is connected via the network 200-003 to the client device 200-004, which browses the transmitted image. Although in the first embodiment the network 200-003 is the Internet, it may be various networks such as a WAN or a LAN.

Figure 3:
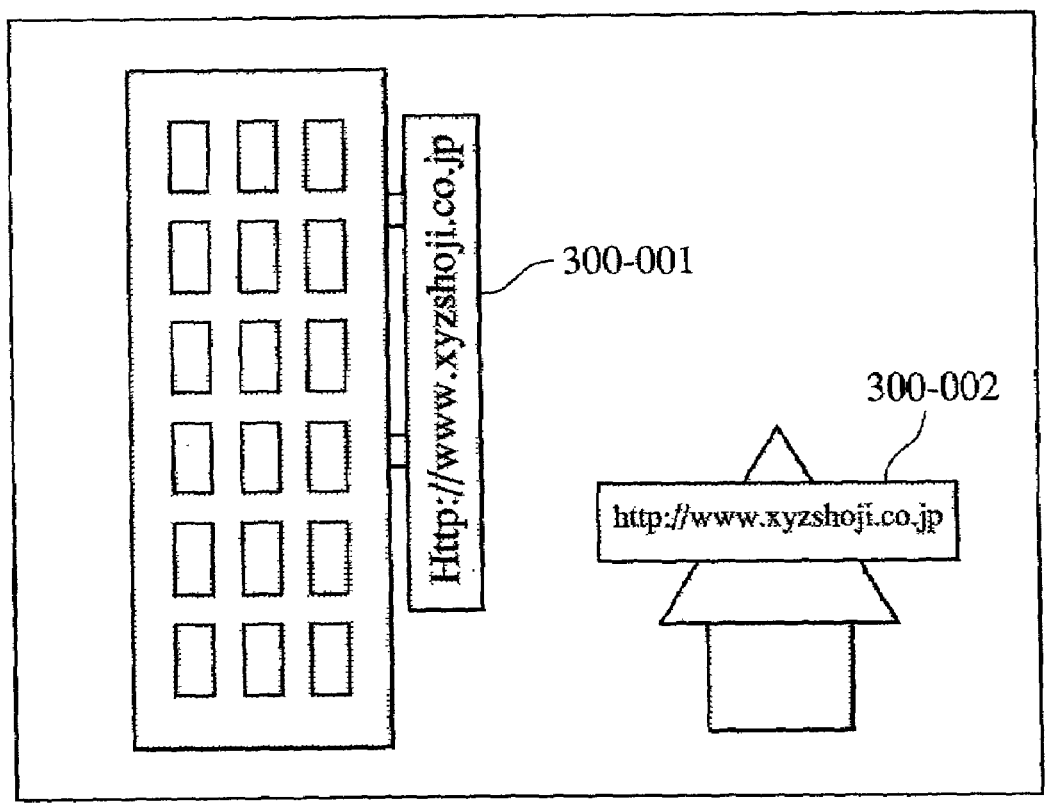
FIG. 3 is a diagram showing an example of an image transmitted by a server device.

FIG. 3 is a diagram showing an example of the image transmitted by the server device 200-002. URLs 300-001 and 300-002 are shown as examples, which are written on signboards on a landscape image such as a building.

Figure 4:
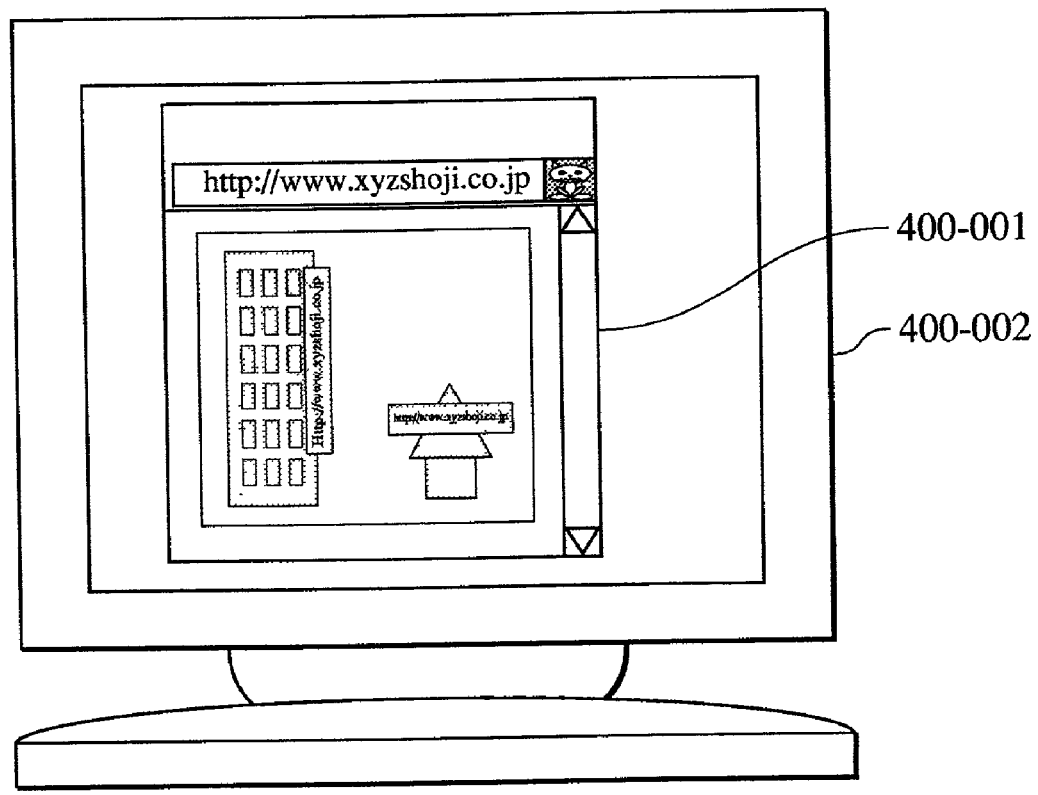
FIG. 4 is a diagram showing an example of a display on a client device.

FIG. 4 is a diagram of an example of the display on the client device 200-004. A window 400-001 is opened by a browser application and existing HTML text data is displayed thereon. A user browses the image and the information on the display shown in FIG. 4.

Figure 5:
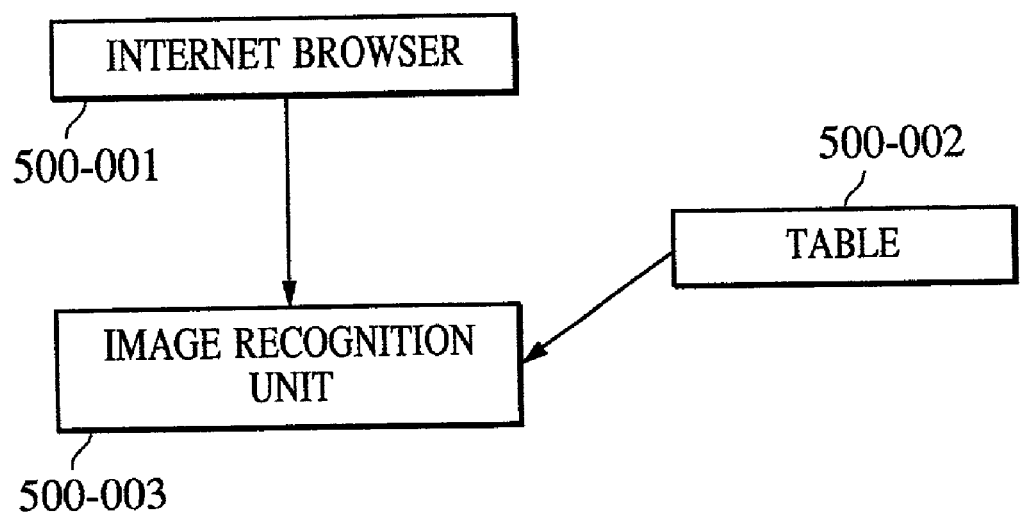
FIG. 5 is a diagram showing a configuration of software in the client device.

FIG. 5 is a diagram showing a configuration of software in the client device 200-004. Reference numeral 500-001 denotes an Internet browser, 500-002 denotes an execution information table used for executing the URL shown in FIG. 10, which will be used in a second embodiment of the present invention, as shown in FIG. 13, and 500-003 denotes an image recognition unit.

Existing software can be used for the Internet browser. More specifically, widely used browser software, e.g., Internet Explorer and Netscape Navigator, or alternatively, software having functions similar thereto may be used. The software has a URL execution information table as shown in FIG. 10, such as a MIME-type table, and processes various data types.

The image recognition unit 500-003 is software for recognizing and extracting URL character string information in an image obtained by the Internet browser 500-001 according to the first embodiment.

Figure 6:
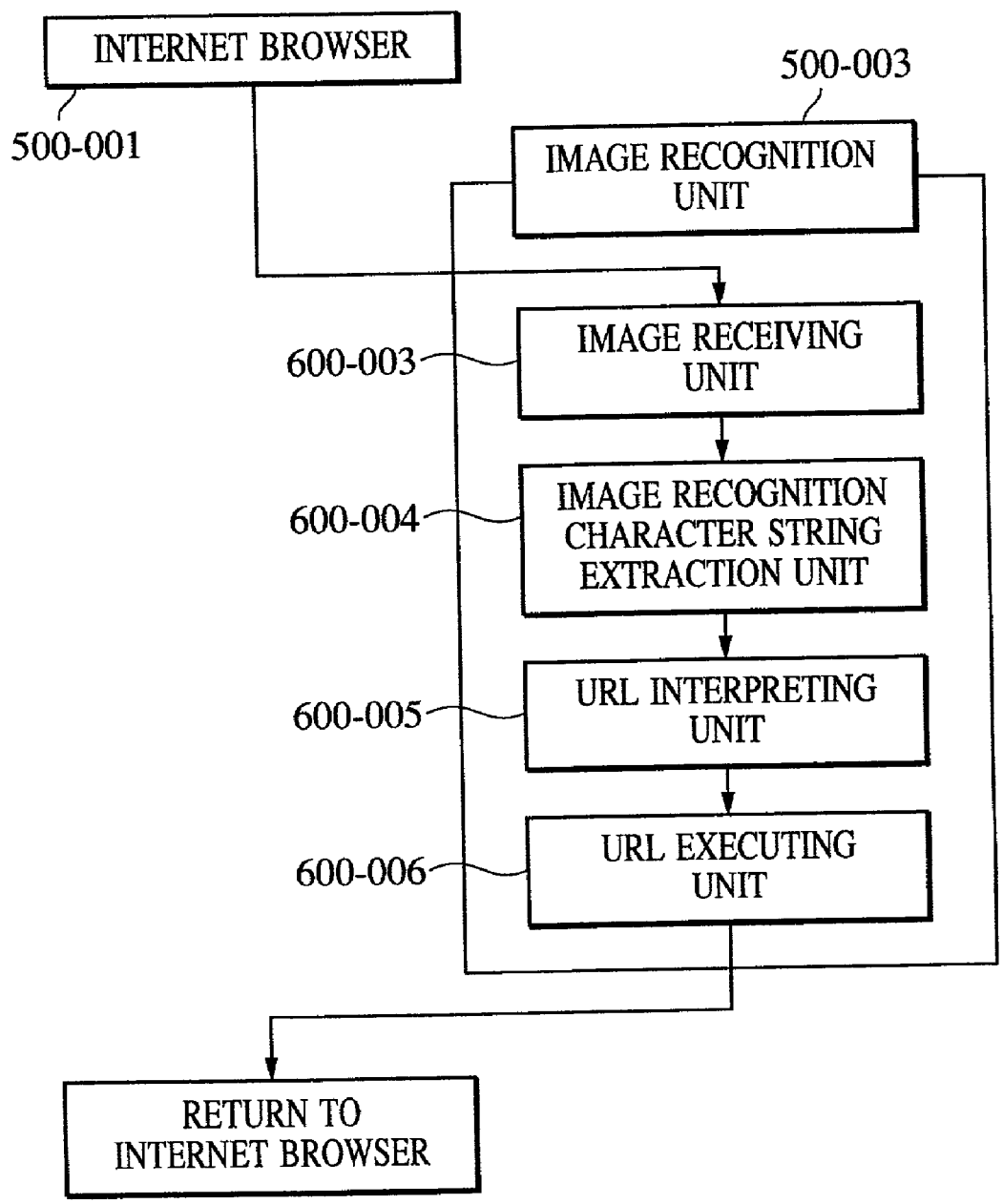
FIG. 6 is a diagram showing the internal structure of an image recognition unit.

FIG. 6 is a diagram showing the internal structure of the image recognition unit 500-003.

The image recognition unit 500-003 comprises an image receiving unit 600-003, an image recognition character string extraction unit 600-004, a URL interpreting unit 600-005, and a URL execution unit 600-006. The image receiving unit 600-003 receives the image transmitted by the server device 200-002. The image recognition character string extraction unit 600-004 determines whether or not there is a character string in the digital moving image or still image captured by the image receiving unit 600-003 and extracts a URL character string if one exists in the character string. The URL interpreting unit 600-005 determines whether or not the syntax of the extracted URL is in the correct notation and whether or not it is correctly interpreted. The URL execution unit 600-006 jumps to the link destination of the URL interpreted by the URL interpreting unit 600-005 in accordance with a predetermined operation.

The image recognition unit 500-003 can be implemented by a plug-in method of the Internet browser 500-001 (method for adding an application function) and can also be implemented by a Java applet. The image recognition unit 500-003 may be implemented by using any desired method for receiving the image from the Internet browser 500-001. The image receiving unit 600-003 receives the image in accordance with the method used. Incidentally, according to the first embodiment, the image receiving unit 600-003 receives the image information, which is periodically (in real time) transmitted from the Internet browser 500-001.

The image recognition character string extraction unit 600-004 identifies and captures the character string based on the received digital moving image or still image, and extracts information including the character string from the received image. The URL interpreting unit 600-005 determines whether or not the syntax of the extracted URL is in the correct notation and whether or not it is correctly interpreted. The URL execution unit 600-006 executes processing in accordance with the data indicated by the extracted URL.

Figure 7:
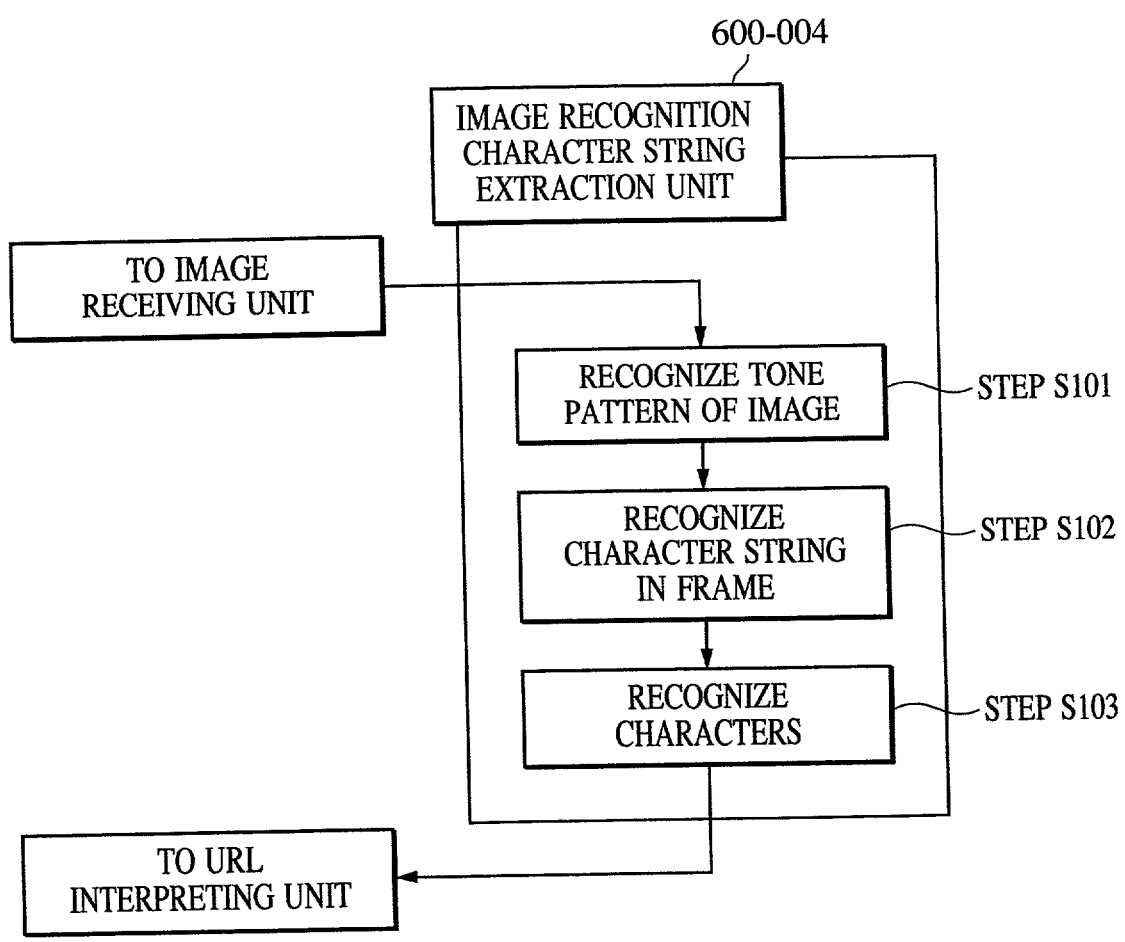
FIG. 7 is a flowchart of processing of an image recognition character string extraction unit.

FIG. 7 is a flowchart of a process of the image recognition character string extraction unit 600-004.

In processing for recognizing a tone pattern of the image in step S101, full-color image data transmitted by the server device 200-002 is converted into binary image data. As a consequence, the URL character string displayed on the signboard can be relatively easily understood. The character string is recognized by recognizing the tone pattern of the binary digital image. The character string can be extracted from the captured digital image by a method similar to a well-known optical recognizing method using an OCR (Optical Character Reader).

In processing for recognizing the character string in a frame in step S102, the frame of the signboard or the like is used for recognition and the character string in the frame is recognized, since the signboard photographed in the landscape image is normally surrounded by a frame, such as a box, in many cases. Then, characters in the character string in the frame are arranged by rotating the characters to arrange them at different angles, and so on, so as to correctly recognize them. The arrangement may be performed by other methods apart from the rotation.

In processing for recognizing the character string in step S103, a normalized URL character string is recognized.

Figure 8:
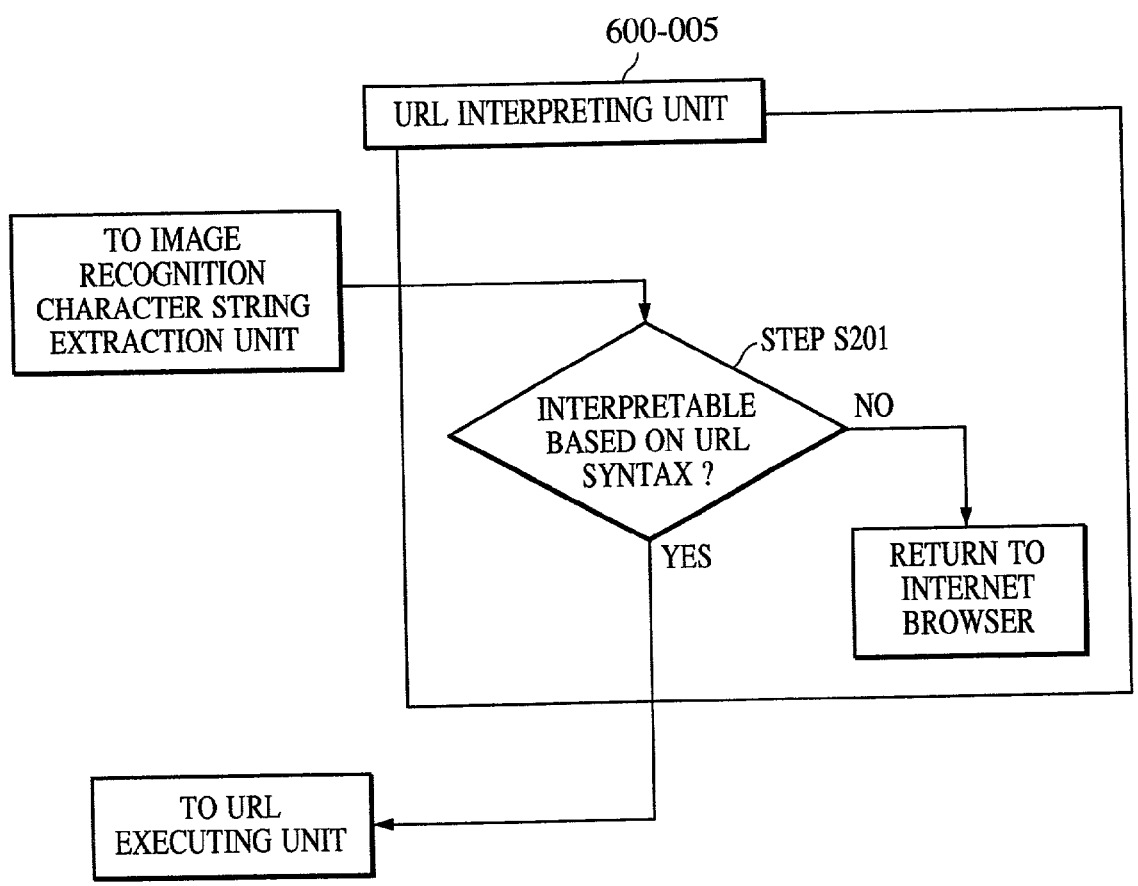
FIG. 8 is a flowchart of processing of a URL interpreting unit.

FIG. 8 is a flowchart showing a process of the URL interpreting unit 600-005.

Generally, a URL syntax notation is formed by using compilers for context analysis, syntax analysis, etc. In step S201, it is determined whether or not the URL is correctly interpreted. If the result is NO in step S201, the processing enters a standby mode until the Internet browser 500-001 obtains an image again. If the result is YES in step S201, the link destination of the address interpreted is automatically accessed by a predetermined operation.

Figure 9:
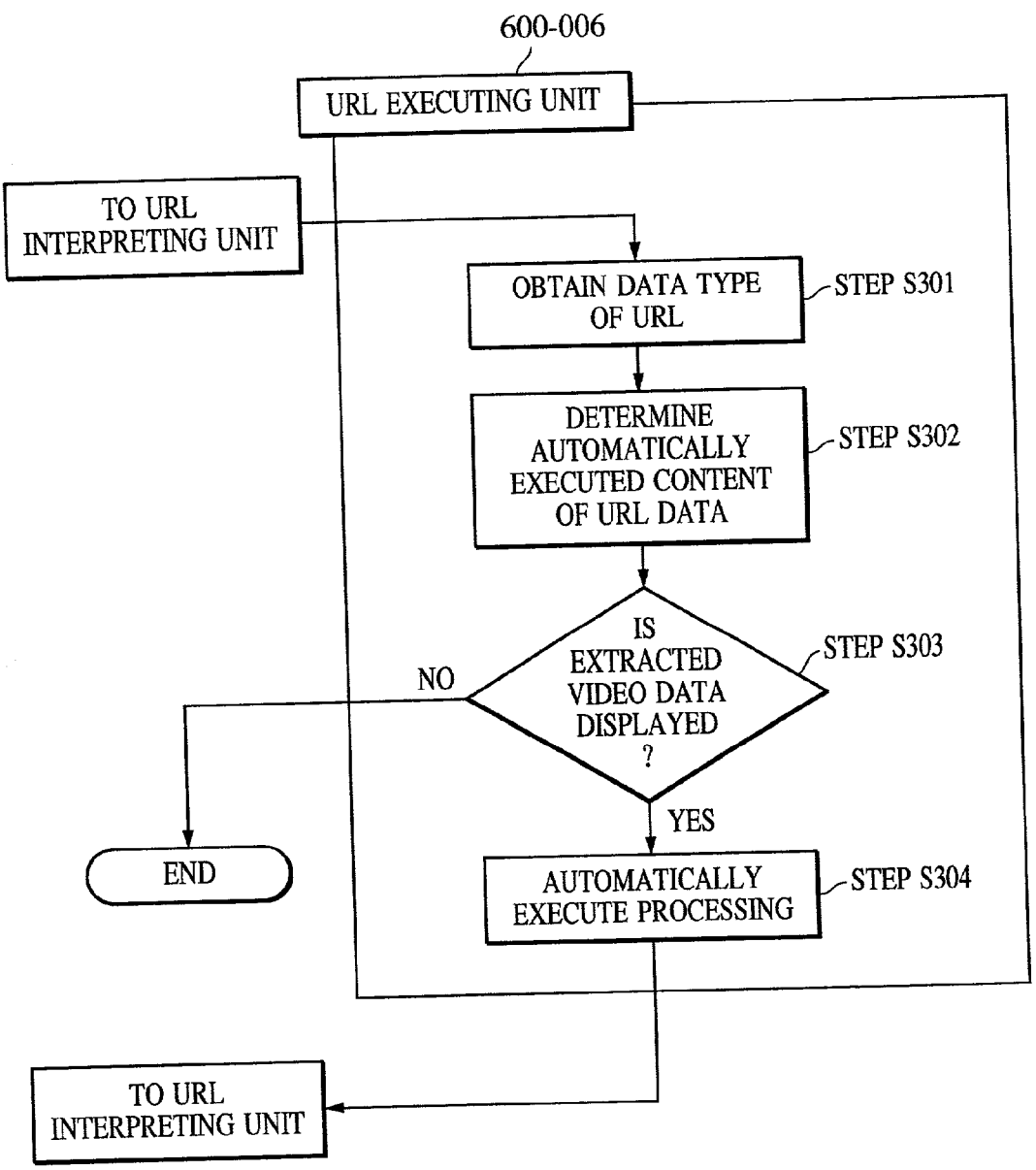
FIG. 9 is a flowchart showing a process of another URL execution unit.

FIG. 9 is a flowchart showing a process of the URL executing unit 600-006.

Referring to FIG. 9, first, the URL executing unit 600-006 obtains the data type indicated by the URL in step S301. Thus, the data type indicated by the URL is determined.

In step S302, execution processing is determined based on the determined data type of the URL and the execution information table shown in FIG. 10, corresponding to the recognized URL. Incidentally, referring to FIG. 10, the phrase "MIME-Type" denotes the data type indicated by the URL, and is an existing data type, etc., prescribed in RFC (Request For Comment) documents. The term "Command" indicates which application is used to open and view the URL. The URL execution information table in FIG. 10 may be shared with the Internet browser 500-001 or may be uniquely set by the image recognition unit 500-003. Alternatively, the user may freely set the URL execution information table in FIG. 10.

In step S303, it is determined whether or not the extracted URL character string is displayed in the image on the window 400-001. If the user changes the photographing direction of the camera 200-001 or the zoom magnification and no extracted URL character string is displayed in the image on the window 400-001, it is determined that the user is no longer concerned about the URL character string and the execution processing of the URL is not performed. If the extracted URL character string is displayed in the image on the window 400-001, the processing routine advances to step S304. The determination in step S303 may be performed by recognizing the URL character string again, or by receiving the image and information on the image photographed by the camera 200-001 from the server device 200-002 and then determining whether or not the current photographed image includes the photographed image when the URL character string is recognized.

In step S304, by clicking on the image including the recognized URL in the window 400-001, the browser software 500-001 is automatically started, thus execution processing corresponding to the URL data type. If the image captured by the camera 200-001 includes no recognized URL, the processing corresponding to the recognized URL is not executed.

As mentioned above, according to the first embodiment, the URL can be obtained from the digital moving image data or the still image data photographed in real time and the URL can be processed.

Second embodiment

Figure 11:
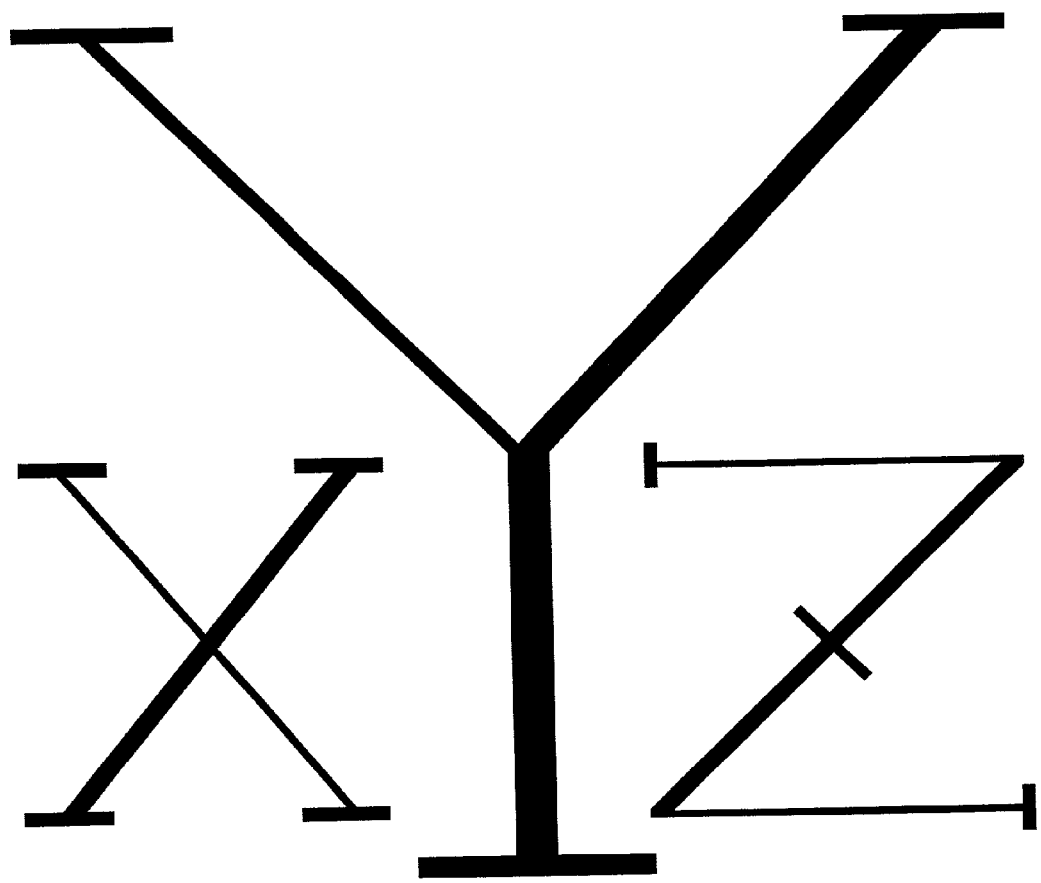
FIG. 11 is a diagram showing examples of symbols.

Although the URL character string in the image is recognized and the processing of the recognized URL is executed according to the first embodiment, a symbol of a company such as a logo can be recognized, as shown in FIG. 11, from the image. The URL of the recognized company is obtained from a previously stored table, and the processing of the obtained URL is executed according to the second embodiment.

Incidentally, according to the second embodiment, the structure and the operations are similar to those of the first embodiment, apart from the fact that the processing of the image recognition character string extraction unit 600-005 is replaced with the processing of a symbol extraction unit 600-007, and the URL interpreting unit 600-005 is unnecessary.

Figure 12:
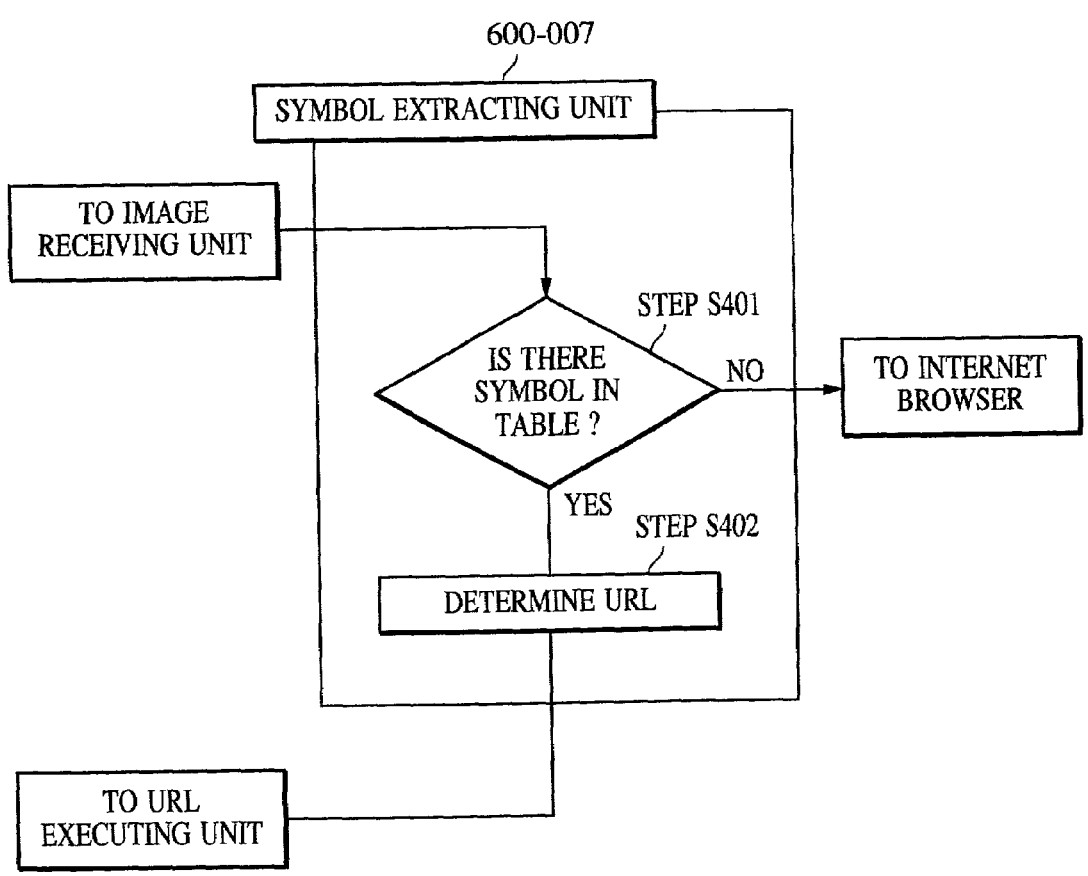
FIG. 12 is a flowchart of processing of a symbol extracting unit.

FIG. 12 is a flowchart showing operational processing of the symbol extraction unit 600-007 according to the second embodiment.

First, in step S401, it is determined whether or not there is a symbol that is stored in a symbol-URL table, as shown in FIG. 13, in the captured image. The symbol-URL table in FIG. 13 stores information on shapes and colors of symbols A, B, C, . . . , which is used for determining the symbol. If the result is YES in step S401, the processing routine advances to step S402, whereupon the URL corresponding to the recognized symbol is determined from the symbol URL table in FIG. 13 and the processing corresponding to the determined URL is executed by the URL execution unit 600-006. If the result is NO in step S401, the process enters a standby mode until an image is received from the Internet browser 500-001 again.

Additionally, the URL executing unit 600-006 determines whether or not the extracted symbol is displayed on the window 400-001. If the user operates the camera 200-001 and an image including the recognized symbol is not displayed on the window 400-001, it is determined that the user is no longer concerned about the symbol and the execution processing of the URL is not performed. It may be determined whether or not the extracted symbol is displayed in the image on the window 400-001 by recognizing the symbol again, or by receiving the image and information on the image photographed by the camera 200-001 from the server device 200-002 and then determining whether or not the current photographed image includes the photographed image when the symbol was recognized.

If the image including the recognized symbol is displayed on the window 400-001, similarly to the case of the first embodiment, by clicking the image including the recognized symbol in the window 400-001, the URL executing unit 600-006 executes processing corresponding to the URL determined in step S402. If the image captured by the camera 200-001 including no symbol recognized is clicked, the processing corresponding to the determined URL is not executed.

As mentioned above, according to the second embodiment, the table pre-stores information on the URL corresponding to the symbol and information for recognizing the symbol such as the company logo. The symbol is extracted from the image, which is photographed in real time, and the processing of the URL corresponding to the symbol extracted from the symbol-URL table is executed. Accordingly, it is possible to provide a system that is convenient for the user.

According to the first and second embodiments, the server accesses the detected URL. However, an email address may be detected, email software may be started, and the detected address may be accessed by transmitting the email.

A storage medium for storing program code of software for executing the above-mentioned functions is provided in a system or an apparatus, and a computer (such as a CPU or an MPU) in the system or the apparatus reads and executes the program code stored in the storage medium. Thus, the functions in the first and second embodiments can be effected.

In this case, the program code read from the storage medium realizes the functions in the first and second embodiments, and the present invention comprises the storage medium which stores the program code.

As for the storage medium for supplying the program code, it is possible to use a floppy disk, a hard disk, an optical disk, a magneto-optical disk, a CD-ROM, a CD-R, a magnetic tape, a nonvolatile memory card, a ROM, and the like.

The functions in the first and second embodiments can be effected not only by executing the program code read by the computer, but also by executing a part or all of the actual processing by an OS (Operating System), which operates on the computer, on the basis of the instructions of the program code.

Further, the functions in the first and second embodiments can be effected by writing the program code read from the storage medium into a memory provided for an expansion board inserted in the computer or an expansion unit connected to the computer, and thereafter executing a part or all of the actual processing by a CPU, etc., provided for the expansion board or function expansion unit, on the basis of the instructions of the program code.

When the storage medium is applied to the first and second embodiments, the storage medium stores the program code corresponding to the above steps. In other words, the storage medium stores modules necessary for the URL obtaining system according to the first and second embodiments.

According to the first and second embodiments, the URL or the predetermined symbol is extracted from the image obtained via the Internet by image recognition and the processing of the URL is automatically performed. Consequently, the convenience for the user can be improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for accessing an address to display a homepage, comprising:
    an operation device that outputs a control command input by a user to mechanically control an image pickup direction of an image pickup device for the image pickup device to obtain an image;
    a receiving device that receives an image obtained by the image pickup device which is controlled based on the control command of the direction of the image pickup device;
    a monitoring device that determines whether the image received by said receiving device includes a predetermined image;
    an extracting device that extracts an address of the homepage corresponding to the predetermined image when the monitoring device determines that the predetermined image is included in the image received by said receiving device; and
    an accessing device that accesses the address extracted by the extracting device corresponding to the predetermined image to display the homepage on a display device when the monitoring device determines that the received image includes the predetermined image and if a user performs an operation to designate the predetermined image.

2. The system according to claim 1, wherein the address includes a URL.

3. A computer-executed method for accessing an address to display a homepage, comprising the steps of:
    outputting, by a control device, a control command input by a user to mechanically control an image pickup direction of an image pickup device for the image pickup device to obtain an image;
    receiving, by an information processing apparatus from the image pickup device, an image obtained by the image pickup device which is controlled based on the control command of the direction of the image pickup device;
    determining, by the information processing apparatus, whether the image received by the receiving step includes a predetermined image;
    extracting, by the information processing apparatus, an address of the homepage corresponding to the predetermined image when the determining step determines that the predetermined image is included in the image received in said receiving step; and
    accessing, by the information processing apparatus, the address extracted by the extracting step corresponding to the predetermined image to display the homepage on a display device when the determining step determines that the received image includes the predetermined image and if a user performs an operation to designate the predetermined image.

4. The method according to claim 3, wherein the address includes a URL.

5. A computer-readable storage medium on which is stored a computer-executable program for a computer to execute a method of for accessing an address to display a homepage, wherein the program comprises:

program code of an outputting step of outputting, by an operation device, a control command input by a user to mechanically control an image pickup direction of an image pickup device for the image pickup device to obtain an image;

program code of a reception step of receiving, by an information processing apparatus, an image obtained by the image pickup device which is controlled based on the control command of the direction of the image pickup device;

program code of a determining step of determining, by the information processing apparatus, whether the image received by the reception step includes a predetermined image;

program code of an extracting step of extracting, by the information processing apparatus, an address of the homepage corresponding to the predetermined image when the determining step determines that the predetermined image is included in the image received by the reception step; and program code of an access step of accessing, by the information processing apparatus, the address extracted in the extracting step corresponding to the predetermined image to display the homepage on a display device when the determining step determines that the received image includes the predetermined image and if a user performs an operation to designate the predetermined image.

6. A computer-readable storage medium according to claim 5, wherein the address includes a URL.

\* \* \* \* \*

UNITED STATES PATENT AND TRADEMARK OFFICE
CERTIFICATE OF CORRECTION

PATENT NO. : 7,188,307 B2 Page 1 of 1
APPLICATION NO. : 09/986244
DATED : March 6, 2007
INVENTOR(S) : Ohsawa It is certified that error appears in the above-identified patent and that said Letters Patent is hereby corrected as shown below:

COLUMN 2:
Line 24, "mage" should read -- image --.

COLUMN 9:
Line 1, "of" should be deleted.

Signed and Sealed this

Eighteenth Day of March, 2008

JON W. DUDAS
*Director of the United States Patent and Trademark Office*